United States Patent
Yu

(10) Patent No.: US 6,817,187 B2
(45) Date of Patent: Nov. 16, 2004

(54) RE-FIRED GAS TURBINE ENGINE

(75) Inventor: Hong Yu, Oakville (CA)

(73) Assignee: Alstom (Switzerland) Ltd., Baden (CH)

( * ) Notice: Subject to any disclaimer, the term of this patent is extended or adjusted under 35 U.S.C. 154(b) by 22 days.

(21) Appl. No.: 10/095,310

(22) Filed: Mar. 11, 2002

(65) Prior Publication Data

US 2002/0148213 A1 Oct. 17, 2002

(30) Foreign Application Priority Data

Mar. 12, 2001 (GB) .............................................. 0106006

(51) Int. Cl.$^7$ ............................................... F02D 7/18
(52) U.S. Cl. ..................... 60/774; 60/39.17; 60/736; 60/782; 60/806
(58) Field of Search ................................ 60/39.17, 791, 60/806, 785, 772, 775, 782, 793, 800, 39.01, 39.23, 39.35, 39.37, 39.38, 39.181, 39.183, 774, 736

(56) References Cited

U.S. PATENT DOCUMENTS

| | | | | |
|---|---|---|---|---|
| 3,054,257 A | * | 9/1962 | Schelp ....................... 60/39.17 |
| 3,315,467 A | * | 4/1967 | De Witt ..................... 60/39.17 |
| 4,598,542 A | * | 7/1986 | Reynolds ................. 60/39.161 |
| 4,896,499 A | * | 1/1990 | Rice .......................... 60/39.161 |
| 5,557,919 A | | 9/1996 | Althaus |
| 2003/0000222 A1 | * | 1/2003 | Tsuji ........................... 60/785 |

FOREIGN PATENT DOCUMENTS

| | | |
|---|---|---|
| EP | 0 978 635 A1 | 8/1998 |
| GB | 2 346 177 A | 8/2000 |

* cited by examiner

Primary Examiner—Louis J. Casaregola
(74) Attorney, Agent, or Firm—Kirschstein, Ltd.

(57) ABSTRACT

In a reheat gas turbine engine for power generation, fuel is burnt with compressed air from a compressor in a first or primary combustor, the combustion products are passed through a high pressure turbine, the exhaust of the high pressure turbine is then burnt together with further fuel in a reheat combustor to consume the excess air, and the exhaust of the second combustor is passed through a lower pressure turbine. Excess air is supplied to the first combustor, thereby enabling so-called "lean burn" combustion for production of low levels of pollutants in the exhaust of the engine. Some turbine components of the turbines, e.g., blades or vanes, are cooled by cooling air supplies tapped off from the compressor. The operating cycle of the gas turbine engine is modified by returning at least some of the spent cooling air from the low pressure turbine to the reheat combustor, where it is burnt with additional fuel to produce a greater volume of exhaust gases, thereby increasing the torque on a shaft and boosting the power output of the generator.

12 Claims, 3 Drawing Sheets

RE-FIRED GAS TURBINE ENGINE

FIELD OF THE INVENTION

This invention relates to gas turbine engines and working cycles of the type in which fuel and excess air are burnt together in a first combustor, the combustion products are passed through a high pressure turbine, the exhaust of the high pressure turbine is then burnt together with further fuel in a second combustor to consume the excess air, and the exhaust of the second combustor is passed through a low pressure turbine. In particular, the invention relates to improved use of cooling air which has passed through turbine components in such a turbine.

BACKGROUND OF THE INVENTION

Re-fired gas turbine engines commonly find use as prime movers in electrical generation plants. Referring to FIG. 1, in general terms an example of such an engine 1 comprises a multi-stage bladed rotary compressor 10 which compresses atmospheric air 12 to a high pressure. This compressed air 14 is then fed to a first combustor 20, which also receives gaseous and/or liquid fuel 16, the air and fuel being burnt together in a first stage of combustion. The resulting high-pressure, high-temperature combustion products 22 are used to drive a bladed rotary high pressure turbine 30, whose work output primarily drives the compressor 10 via transmission shaft 40. The air 14 supplied to combustor 20 is more than is required for complete combustion of the fuel 16 and therefore the turbine exhaust 34 contains excess air which can then be burnt with further fuel 36 in a reheat combustor 50. Bladed rotary low pressure turbine 60 receives the reheat combustion products 52 from reheat combustor 50 and uses them to drive electrical generator 70 through shaft 80. The low pressure and high pressure turbines are optionally connected together by a shaft 90, shown in dashed lines, shaft 90 being present if it is desired that both turbines 30 and 60 always run at the same speed. The exhaust 62 of the low pressure turbine 60 can be passed to atmosphere, preferably after passing through a heat exchanger for heat recovery (not shown).

To extend the life of components in the turbines, such as rotor blades, stator blades and nozzle guide vanes, it is well known to pass compressed air through them for cooling purposes. Hence, as shown in FIG. 1, both the high and low pressure turbines are provided with supplies of cooling air via lines 90 and 92 respectively, these being tapped off from the compressor 10. Because high pressure turbine 30 requires cooling air 90 which is at the highest available pressure, its supply is taken from at or near the output of the compressor 10, but low pressure turbine 60 can be supplied with cooling air 92 at a lower pressure, so it is taken from an earlier stage of the compressor. In both cases, the amount and pressure of compressed air taken from the compressor 10 for cooling purposes must be the minimum necessary to provide adequate cooling of the components, because extraction of working fluid from this early part of the engine's working cycle imposes a cycle efficiency penalty which, unless it can be compensated for by the use of higher working fluid temperatures in the turbines, reduces the amount of power available from the low pressure turbine 60 on shaft 80.

In known engine arrangements of this type, after the cooling air has passed through the hollow interior of a turbine component such as a blade or vane, it is exhausted into the turbine annulus either from the outer tip or shroud of the blade or vane, or via small cooling holes in their flanks or in their leading or trailing edges, the cooling holes being provided in areas particularly exposed to high temperature combustion products. For example, a common cooling technique used in such circumstances is so-called "film cooling", in which an array of small closely-spaced holes are provided to connect part of the exterior surface of the component to an interior passage through which the cooling air is flowing. Where the cooling air exits from the array of holes onto the component surface, a film of relatively cool air is formed next to the surface, thereby protecting the component from the full effects of the hot combustion gases. However, this practice of exhausting used cooling air into the turbine working passages further complicates the problem of optimizing cycle efficiency, because the cooling flow reduces the mean working fluid temperature in the turbine passage, so reducing turbine power output and efficiency.

SUMMARY OF THE INVENTION

It is an object of the present invention to increase turbine power output and turbine efficiency by reducing the diluting effects of cooling air exhausted from turbine components.

According to the present invention, a gas turbine engine comprises in flow series;

a compressor for compressing air to a high pressure, a first combustor having fuel injection means for burning fuel together with high pressure air supplied from the compressor, the air supplied to the first combustor being in excess of that required for complete combustion of the fuel, a high pressure turbine intended to be driven by combustion products from the first combustor, a second combustor having fuel injection means for burning further fuel together with exhaust gases of the high pressure turbine, thereby to consume the excess air, a lower pressure turbine having at least a first turbine stage comprising a ring of nozzle guide vanes and a first stage of rotor blades intended to be driven by combustion products from the second combustor, the lower pressure turbine having components of at least the lower pressure turbine which are cooled by cooling air supplied from the compressor, means for supplying the second combustor with at least a portion of the cooling air after it has passed through the lower pressure turbine components, and means for supplying sufficient fuel to the second combustor to burn therein with the portion of cooling air, thereby to increase the first stage turbine rotor entry temperature relative to an otherwise similar engine in which the portion of cooling air is exhausted into the lower pressure turbine after it has passed through the lower pressure turbine components.

For a given exit temperature of the combustion gases from the second or reheat combustor, the invention reduces cooling air dilution of the turbine gases relative to the prior art, i.e., the efficiency of the turbine is increased. For example: compare a prior art engine, in which some of the cooling air passing through the nozzle guide vanes (NGV's) is exhausted to the turbine passage through film cooling holes, with an engine according to the present invention (but otherwise identical with the prior art), in which the same amount of cooling air is recycled to the second combustor instead of being exhausted to the turbine passage. Provided that enough fuel is supplied to be burnt with the cooling air in the second combustor to ensure the combustor exit temperature is at least maintained at the same value as in the prior art, the turbine rotor entry temperature will be increased relative to the prior art.

In an preferred embodiment of the invention, the gas turbine engine is provided with a heat exchanger arrangement for cooling the cooling air before it is supplied to the turbine components; thus, the heat exchanger arrangement may put the cooling air in heat exchange relationship with fuel, thereby to heat the fuel before injection of the fuel into the first and/or the second combustor.

The cooled turbine components may comprise stator blades in at least one stage of turbine blading and preferably include at least nozzle guide vanes constituting a first stage of the low pressure turbine.

The invention further provides a gas turbine engine operating cycle, in which fuel and excess air are burnt together in a first combustor, the combustion products are passed through a high pressure turbine, the exhaust of the high pressure turbine is then burnt together with further fuel in a second combustor to consume the excess air, and the exhaust of the second combustor is passed through a lower pressure turbine, the air supplied to the first combustor being in excess of that required for complete combustion of the fuel, wherein components of at least the lower pressure turbine are cooled by cooling air supplied from the compressor and the second combustor is supplied with at least some of the cooling air after it has passed through the turbine components, sufficient fuel being supplied to the second combustor to burn therein with the portion of cooling air, thereby to increase the first stage lower pressure turbine rotor entry temperature relative to an otherwise similar engine in which the portion of cooling air is exhausted into the first stage lower pressure turbine after it has passed through the lower pressure turbine components.

Further aspects of the invention will be apparent from the accompanying description and claims.

BRIEF DESCRIPTION OF THE DRAWINGS

Exemplary embodiments of the invention will now be described with reference to the accompanying drawings, in which.

DESCRIPTION OF THE PREFERRED EMBODIMENTS

Figure 1:
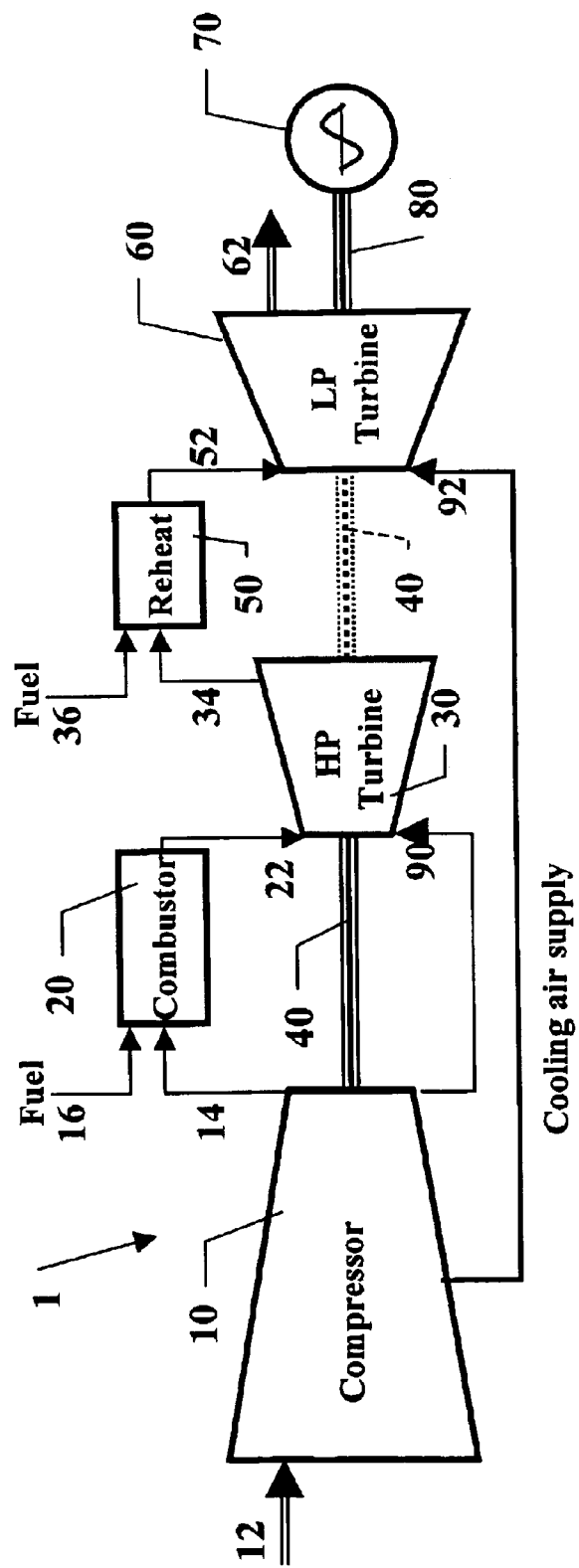
FIG. 1 is a diagrammatic representation of a prior art gas turbine engine having a cooling air supply to the low pressure turbine.
Figure 2:
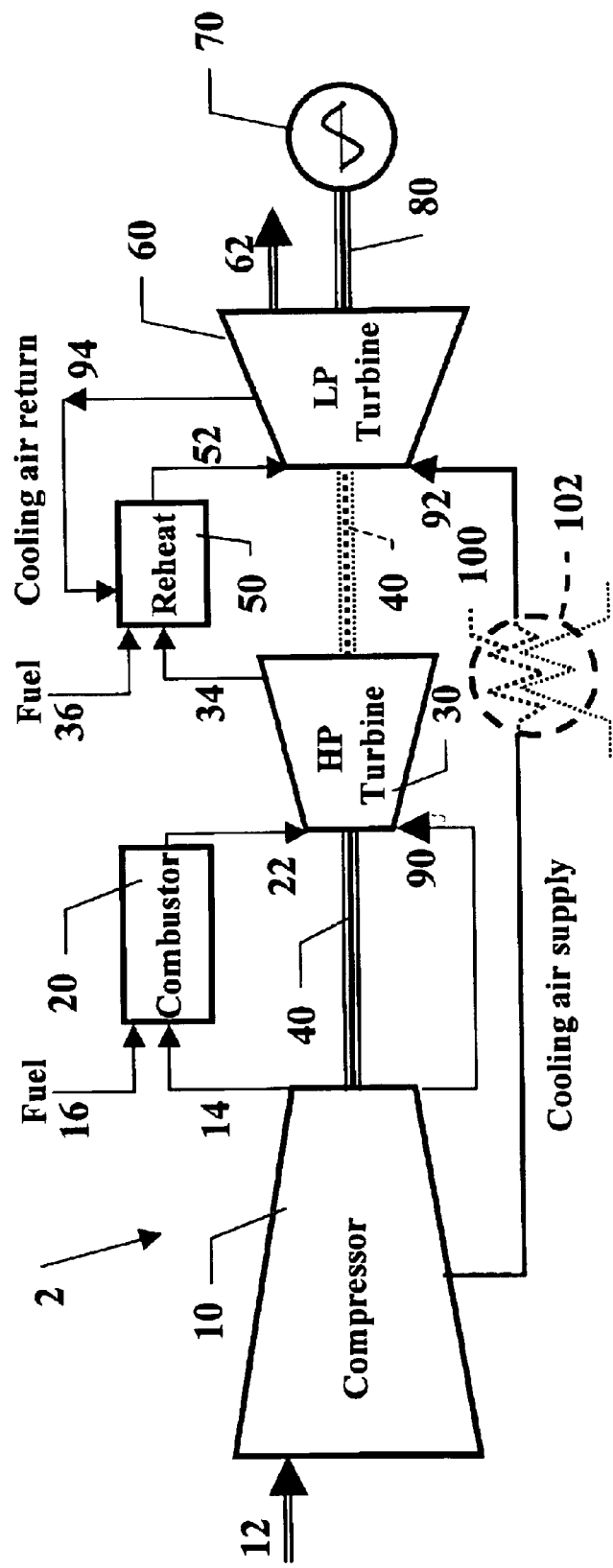
FIG. 2 is a diagram similar to FIG. 1, but showing an engine modified in accordance with the present invention.

Referring to FIG. 2, components of a modified engine 2 already described with reference to FIG. 1 are indicated by the same reference numbers. Thus, fuel 16 is burnt with compressed air 14 from compressor 10 in a first or primary combustor 20, the combustion products 22 are passed through a high pressure turbine 30, the exhaust 34 of the high pressure turbine 30 is then burnt together with further fuel 36 in a second or reheat combustor 50 to consume the excess air, and the exhaust 52 of the second combustor 50 is passed through a lower pressure turbine 60. The air 14 supplied to the first combustor 20 is in excess of that required for complete combustion of the fuel 16, thereby enabling so-called "lean burn" combustion for production of low levels of pollutants in the exhaust of the engine. Some components of the turbines, such as rotor blades, stator blades or nozzle guide vanes, are cooled by cooling air supplies 90, 92 tapped off from the compressor. It will be seen that the operating cycle of the gas turbine engine 1 is modified in accordance with the present invention by returning at least some of the spent cooling air 94 from the low pressure turbine 60 to an earlier part of the operating cycle—namely the second or reheat combustor 50—where it is burnt with additional fuel 36 to produce a greater volume of exhaust gases 52, thereby increasing the torque on shaft 80 and boosting the power output of the generator 70. In particular, whereas it is known to utilise some of the cooling air which passes through the nozzle guide vanes to effect film cooling of their flanks, the invention contemplates the elimination or reduction of such film cooling and the passing of air used for internal cooling of the NGV's to the reheat combustor.

The present invention makes use of the fact that a re-fired gas turbine of the type described has a relatively high pressure rise through the compressor and a large pressure drop across the high pressure turbine. The invention recognises that cooling air tapped from an intermediate pressure stage of the compressor can be used to cool the low pressure turbine and yet still have sufficient pressure remaining to enable it to be fed back to the second combustor. The exact cooling air supply pressure necessary to achieve this can be selected by trading off the cooling duties it performs against the cycle efficiency.

Figure 3:
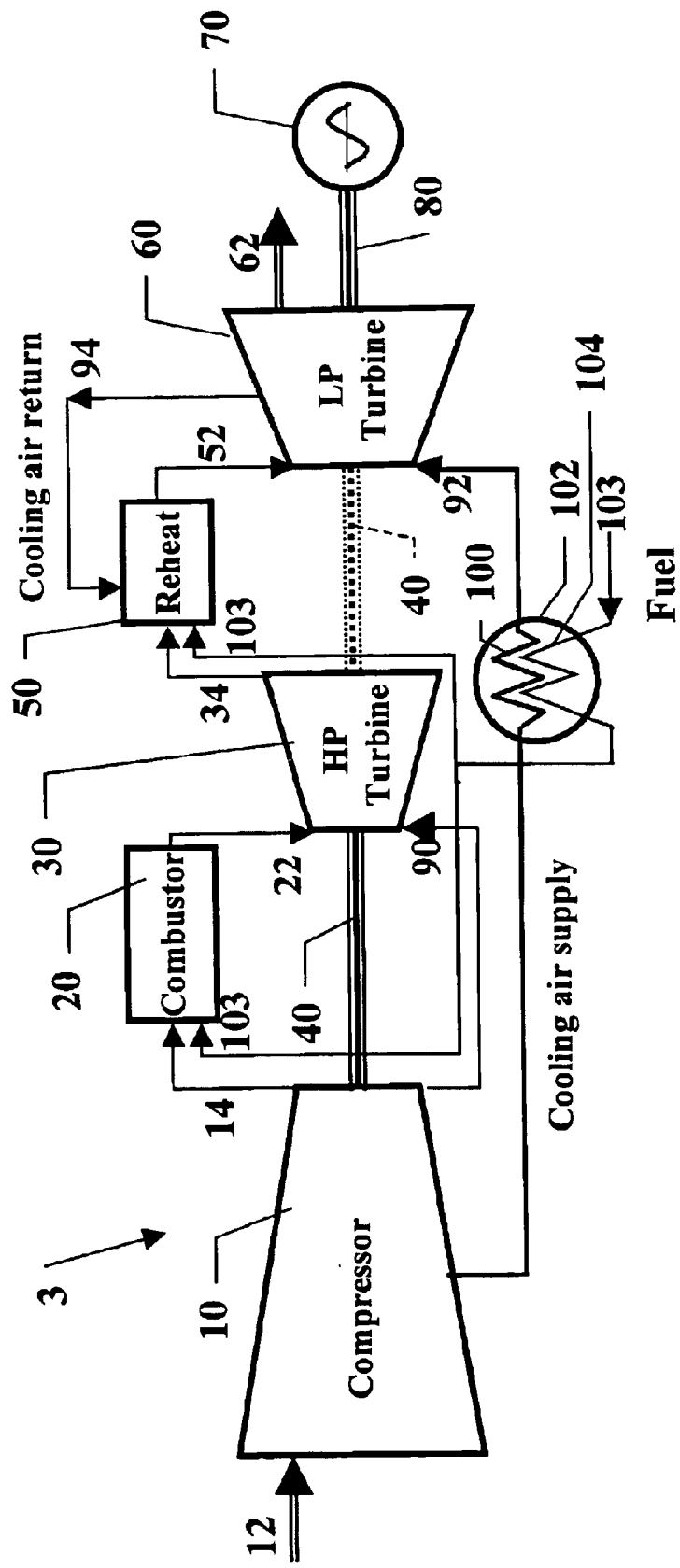
FIG. 3 is similar to FIG. 2, but showing a further embodiment of the invention.

As shown in FIG. 2, cooling air 92 may be passed through one side 100 of a cooler or heat exchanger 102 (shown in dashed lines) to reduce the temperature of the cooling air 92 before it passes through the low pressure turbine components. This enables the cooling air to exert a more pronounced cooling effect on the components and thus facilitates more economic use of cooling air, thereby further increasing cycle efficiency. As shown in FIG. 3, it is particularly convenient and efficient if fuel for at least the reheat combustor 50 of an engine 3, but preferably both combustors, is passed through the other side 104 of the heat exchanger 100 so that the fuel is heated before it is injected into the combustor(s). This reduces the amount of heat energy needed to vaporize and burn the fuel, thereby increasing the energy obtained by burning the fuel in the combustor.

A further or alternative benefit obtainable from the use of this invention is that for a given rotor inlet temperature, recycling of the low pressure turbine cooling air to the reheat combustor results in a reduced flame temperature, thus reducing formation of oxides of nitrogen.

It will be understood that each of the elements described above, or two or more together, also may find a useful application in other types of constructions differing from the types described above.

While the invention has been illustrated and described as embodied in a re-fired gas turbine engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A gas turbine engine comprising, in flow series:
   a) a multi-stage compressor for compressing air to a high pressure,
   b) a first combustor having fuel injection means for burning fuel together with the high pressure air supplied from the compressor to form combustion products, the air supplied to the first combustor during operation of the engine being in excess of that required for complete combustion of the fuel,
   c) a high pressure turbine for being driven by the combustion products from the first combustor to form exhaust gases,
   d) a second combustor having fuel injection means for burning further fuel together with the exhaust gases of the high pressure turbine to form combustion products, thereby to consume the excess air,
   e) a lower pressure turbine comprising turbine components that require cooling during operation of the engine,
   f) means for tapping off a supply of cooling air from an intermediate stage of the compressor and supplying it to the turbine components that require cooling in the lower pressure turbine without first passing the cooling air through components in the high pressure turbine,
   g) means for supplying the second combustor with at least a portion of the cooling air after it has passed through the lower pressure turbine components, and
   h) means for supplying sufficient fuel to the second combustor to burn therein with the portion of cooling air.

2. The gas turbine engine according to claim 1, and a heat exchanger arrangement for cooling the cooling air before it is supplied to the turbine components.

3. The gas turbine engine according to claim 2, in which the heat exchanger arrangement comprises means for putting the cooling air in heat exchange relationship with the fuel before injection of the fuel into one of the first and the second combustors.

4. The gas turbine engine according to claim 2, in which the heat exchanger arrangement comprises means for putting the cooling air in heat exchange relationship with the fuel before injection of the fuel into at least the second combustor.

5. The gas turbine engine according to claim 1, in which the cooled turbine components comprise stator blades in at least one stage of turbine blading.

6. The gas turbine engine according to claim 1, in which the cooled turbine components comprise nozzle guide vanes before a first stage of the lower pressure turbine.

7. An operating cycle for a gas turbine engine comprising a multi-stage compressor, first and second combustors, a high pressure turbine and a lower pressure turbine, the operating cycle comprising the steps of:
   a) burning fuel and excess air together in a first combustor to form combustion products;
   b) passing the first combustor combustion products through the high pressure turbine, the high pressure turbine forming an exhaust;
   c) burning the high pressure turbine exhaust together with further fuel in the second combustor to consume the excess air and form further combustion products;
   d) passing the further combustion products through the lower pressure turbine;
   e) tapping off cooling air from an intermediate stage of the compressor;
   f) supplying the cooling air to components requiring cooling in the lower pressure turbine without first passing the cooling air through components in the high pressure turbine;
   g) supplying the second combustor with at least some of the cooling air after it has passed through the turbine components; and
   h) supplying sufficient fuel to the second combustor to burn therein with the cooling air.

8. The gas turbine engine operating cycle according to claim 7, which the cooling air is cooled before it is supplied to the turbine components.

9. The gas turbine engine operating cycle according to claim 8, in which the cooling air is cooled by being put into heat exchange relationship with the fuel, thereby to heat the fuel before injection of the fuel into one of the first and the second combustors.

10. The gas turbine engine operating cycle according to claim 8, in which the cooling air is cooled by being put into heat exchange relationship with the fuel, thereby to heat the fuel before injection of the fuel into at least the second combustor.

11. The gas turbine engine operating cycle according to claim 7, in which the cooling air is passed through stator blades in at least one stage of turbine blading.

12. The gas turbine engine operating cycle according to claim 7, in which the cooling air is passed through nozzle guide vanes constituting a first stage of the lower pressure turbine.

* * * * *